July 21, 1931. R. T. HURLEY 1,815,844
MOUNTING FOR TRAFFIC WARNING DEVICES
Filed March 14, 1930
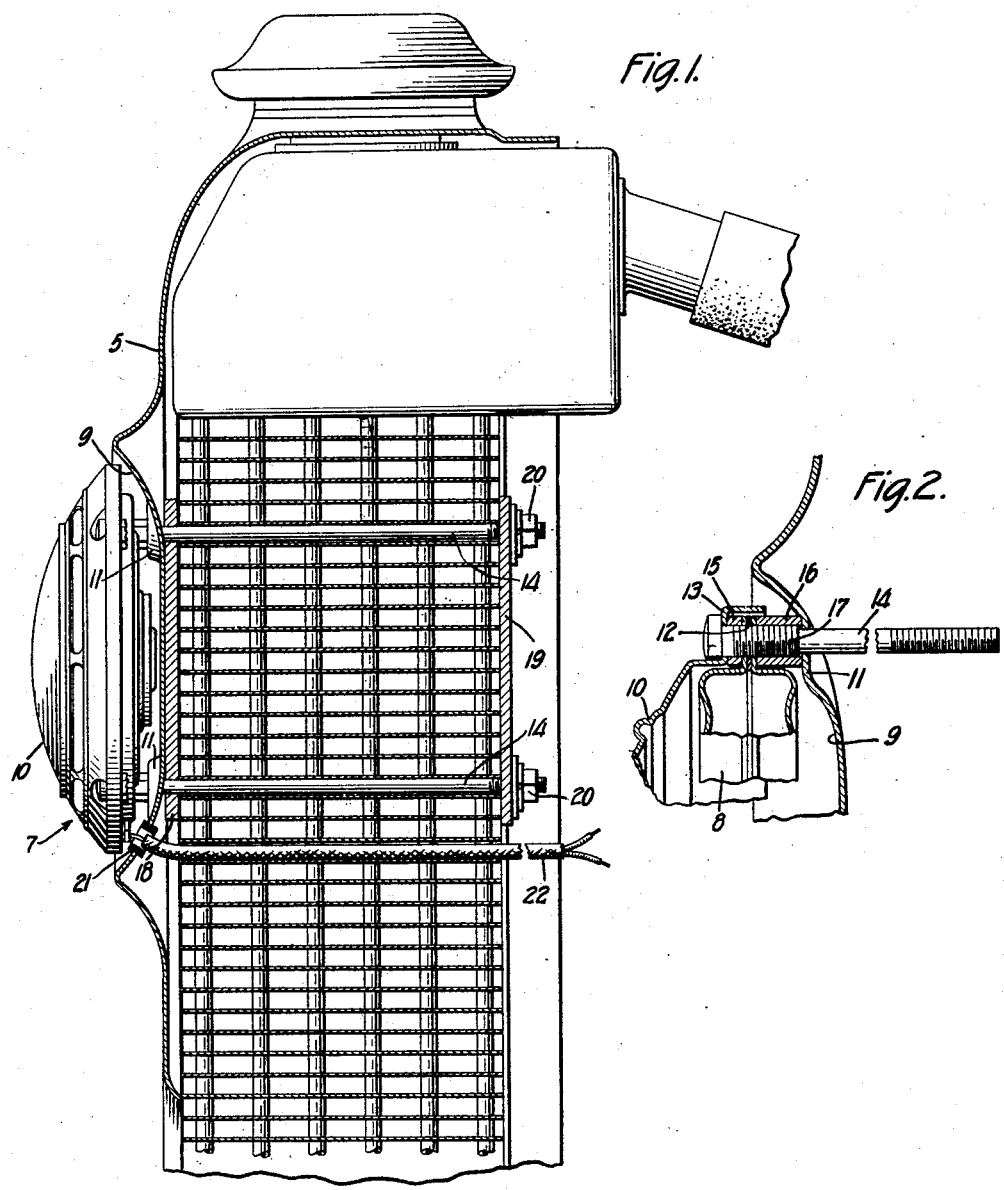
INVENTOR
Roy T. Hurley
BY Moses & Nolte
ATTORNEYS Patented July 21, 1931

1,815,844

UNITED STATES PATENT OFFICE

ROY T. HURLEY, OF DOBBS FERRY, NEW YORK, ASSIGNOR TO MOTO METER GAUGE & EQUIPMENT CORPORATION, A CORPORATION OF DELAWARE

MOUNTING FOR TRAFFIC WARNING DEVICES

Application filed March 14, 1930. Serial No. 435,710.

This invention relates to a novel mounting for traffic warning devices.

It is an object of the invention to mount a traffic warning device, such as a signal horn, at the front of the vehicle, the horn being preferably of the watch case type shown in my copending application, Ser. No. 348,020, where it may serve as an ornament, and so that the sound is not muffled.

In order to accomplish the above object I prefer to mount the horn on the radiator of the vehicle, the radiator shell being formed for the purpose, as a support for the horn and as a reflector for the sound thereof. One of the objects of the invention, therefore, is to provide a radiator or radiator shell construction which serves as a support and backing for the horn cooperating therewith to serve as a sound reflector and/or to give the desired ornamental effect.

Other objects and advantages will become apparent to those skilled in the art from the following specification and the accompanying drawings, which are directed to a preferred embodiment of the invention.

In the drawings:

Fig. 1 is a fragmentary, sectional, side elevation of the preferred embodiment of my invention.

Fig. 2 is a fragmentary view of a detail.

It will be understood that the radiator shell 5 covers the top, bottom, and both sides of the radiator core 6, as well as the margins of the front face thereof, as is customary in such constructions. The manner of mounting the shell 5 and its general relationship to the radiator 5 is not altered by the present invention, the motor manufacturer being free to follow any preferred practice.

In the preferred embodiment of the present invention, the shell 5 is provided with a portion which overlies the radiator tubes, whereby the mounting of the signal horn 7 is facilitated. It will be understood that other mounting devices may be used in lieu of those shown without departing from the spirit of the invention.

The signalling device per se is shown in a fragmentary manner by the part designated 8 in Fig. 2, this showing being thought sufficient for the purposes of illustrating the present invention, which is directed to the radiator shell and to its cooperation with the signalling device. The signalling device is drum shaped and constitutes a water-tight closed chamber housing all the operating elements, the walls of the chamber preferably forming the sound emitting diaphragm. This device cooperates with the radiator shell to give the high ornamental effect sought, whereas other signalling devices known hitherto are unsightly objects and are entirely unsuited for mounting in the front part of the vehicle.

The radiator shell 5 is provided with a dish-shaped depressed portion 9 which is adapted to receive the device 8 and to cooperate with the ornamental cover 10 of the device, to form a housing therefor, and to serve as a sound reflector; the same also serving to give the desired ornamental effect.

In order to facilitate the mounting of the signal device 8 and the assembly of the cover 10 with the radiator shell the part 9 is provided with apertured shoulder portions 11. The device 8 is provided with corresponding apertures in its flange 12, and the flange 13 of the cover 10 is similarly provided with corresponding apertures, to permit the threaded bolts 14 to pass through these apertures.

A spacing sleeve 15 is preferably carried by each bolt 14 and disposed between the flanges 12 and 13. Another spacing sleeve 16, which may have an interior thread, is disposed between flange 12 and shoulder 11.

The portion 17 of the shank of the bolt 14 may be larger than the remainder of the shank and have an exterior thread which cooperates with sleeve 16 to complete the assembly in readiness for mounting the same on the vehicle.

Shock absorbing plates 18 and 19 of paper or other suitable material are preferably mounted in engagement with the radiator in the manner shown, these plates being apertured to receive the bolts 14 and serving to distribute the stresses over the radiator. The bolts 14 pass through cover 10, the signal device 8, the shell shoulders 11, through the passages in the radiator and through the plates 18 and 19, and are clamped by nuts 20. The shell portion 9 is provided with an aperture carrying an insulating bushing 21 to provide access for the lead conductor 22 which passes through the radiator and is connected to the signal device.

While I have illustrated and described a preferred embodiment of my invention, it is to be understood that various changes may be made therein, all embodying the principle of my invention and falling within the scope of the appended claims.

I claim:

1. In a motor vehicle, in combination, a radiator core, a radiator shell covering a portion of the front of the core, said shell being formed to provide in front of the core a forwardly opening chamber for containing a traffic warning device.

2. In a motor vehicle, the combination of a drum-shaped traffic warning device, having a perforate front plate and a radiator shell having a portion thereof shaped to form a housing for said device, the front plate of the traffic warning device forming the front wall of said housing.

3. In a motor vehicle, the combination of a traffic warning device, and a radiator core and a radiator shell having in front of the core a dish shaped portion in the front face thereof to receive said device.

In testimony whereof I have affixed my signature to this specification.

ROY T. HURLEY.